Patented July 21, 1931

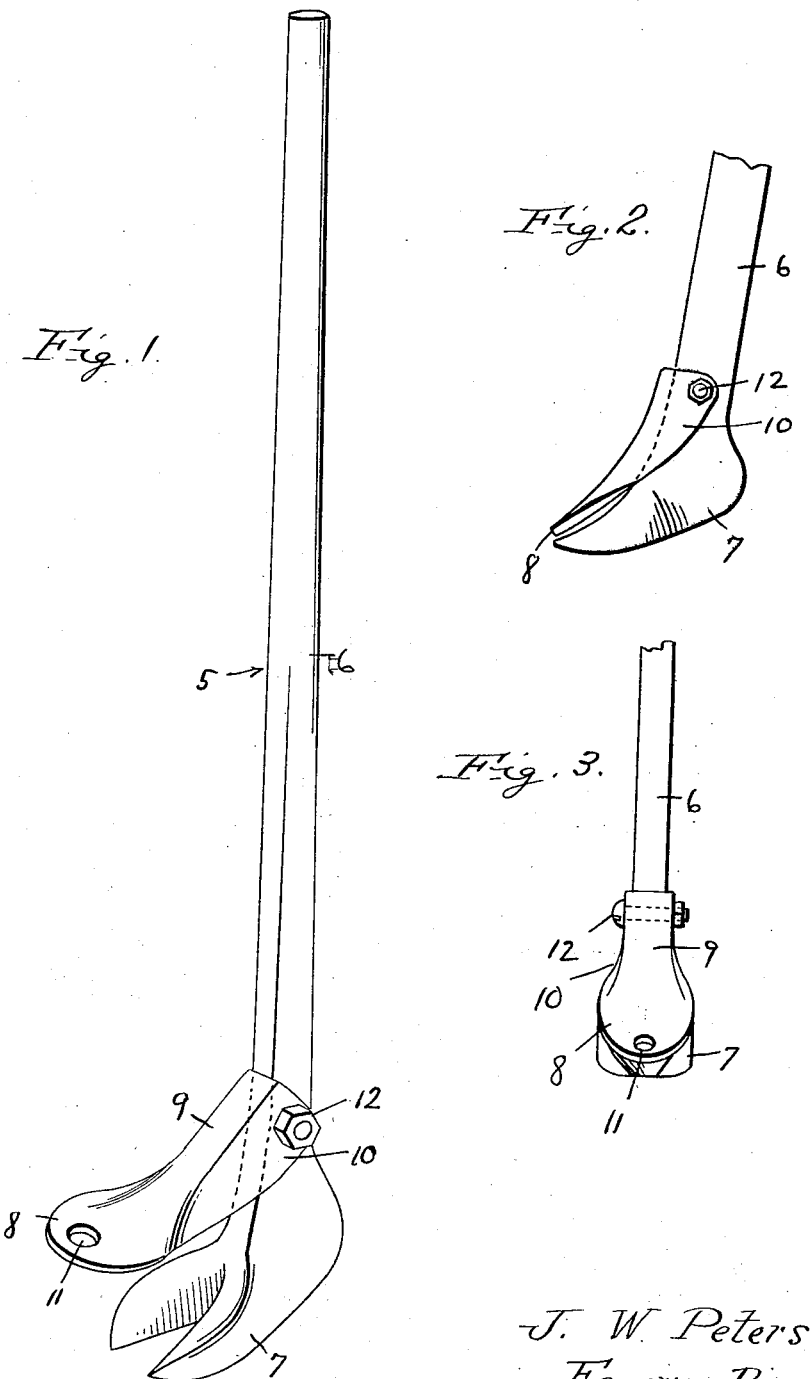

1,815,114

UNITED STATES PATENT OFFICE

JOHN W. PETERSEN AND EMERY BEVARD, OF ESTHERVILLE, IOWA

SHIELD ATTACHMENT FOR CLAW BARS

Application filed June 25, 1929. Serial No. 373,556.

This invention relates to claw bars and has more particular reference to a shield for a claw bar, said shield being especially designed so as to protect the user of the claw bar from the danger of being struck by the flying head of a spike, since as is very often the case, when pulling a spike from a tie or the like with a claw bar, the head of the spike will fly off and injure the person operating the claw bar.

Another very important object of the invention is to provide a shield of the above mentioned nature, which is very simple in construction, can be attached to any conventional make of claw bar, will not interfere in any way with the usual operation of the claw bar, is inexpensive, and is thoroughly reliable and practical in operation.

Other objects and advantages of the invention will become apparent during a study of the following description, taken in connection with the accompanying drawings, wherein:

Figure 1 is a perspective view of a claw bar showing a practical application of the invention.

Figure 2 is a side view thereof.

Figure 3 is a front elevation thereof.

With reference more in detail to the drawings, it will be seen that 5 designates generally a claw bar of conventional construction comprising the handle or shank 6, and claw head 7. As illustrated the shield is preferably formed from a single piece of metal and consists of a substantially rounded flat head portion 8, merging into a rearwardly and upwardly extending shank portion 9. The shank 9 is substantially U-shaped in formation being provided with the side web 10, said web tapering in width and merging into the head 8 of the shield. The head is further provided with a sight opening 11.

In practice, the shield is pivotally connected or attached to the shank 6 of the claw bar at the juncture of the shank and claw head 7, the webs 10 of the shank being disposed one to each side of the shank 6 of the claw bar, and a single bolt passed therethrough as illustrated at 12, providing a pivot pin for the shield. Thus it will be seen that in normal positions the head 8 of the shield is adapted to rest on the claw of the bar, in such a manner as not to interfere with the claw, the shield being at the same time permitted to raise upwardly from the claw, so that the shank of a bolt may be gripped by the claw in the usual manner, in which case the shield will cover the head of the bolt. This being the case, it will be seen that when a pull or pressure is exerted upon the claw bar for pulling a spike out of a rail ply or the like, should the end of the spike become broken off, the head will be prevented from flying off and injuring the one operating the bar, since it is apparent that the broken head of the spike will first strike against the shield so that even if the force is enough to raise the shield, the same will only be raised a suitable height, since it is apparent that the shank 9 of the shield will strike against the shank of the claw bar, as for example to a position shown in Figure 1. Thus, the force of the flying head will be arrested, since the same will merely strike the shield and then fall harmlessly to one side. The plate 11 formed in the shield will of course permit the user to see the head of the spike and thus the shield will in no way interfere with the operator from gripping the spike in the usual manner.

From the foregoing then, it will be seen that we have provided a thoroughly practical and efficient shield for use with claw bars and which will be found to be thoroughly practical and reliable in use and otherwise well adapted for the purpose designed.

Even though we have herein shown and described the preferred embodiment of the invention, it is to be understood that the same is susceptible to changes fully comprehended by the spirit of the invention and the scope of the appended claim.

What is claimed is:

A shield for claw bars, comprising a body formed from a single blank of material and including a relatively large head portion merging into a relatively narrow elongated shank portion extending upwardly and outwardly from said head portion, said shank portion being substantially inverted U-shaped in cross section and adapted to receive between the sides thereof adjacent the free end of the shank, the handle portion of a claw bar, and a pivot bolt extending thru the sides of said shank portion and an adjacent portion of the claw bar for pivotally supporting said shield in operative position with respect to the claw of said claw bar, and the head portion of said shield remote from said shank provided with a sight opening.

In testimony whereof we affix our signatures.

JOHN W. PETERSEN.
EMERY BEVARD.